July 22, 1941.  F. I. HONDERICH  2,250,196

VULCANIZER SEAL

Filed Oct. 27, 1938

INVENTOR.
FRANCIS I. HONDERICH
BY
ATTORNEYS.

Patented July 22, 1941

2,250,196

UNITED STATES PATENT OFFICE 2,250,196

VULCANIZER SEAL

Francis I. Honderich, Natchez, Miss., assignor, by mesne assignments, to United States Rubber Company, New York, N. Y., a corporation of New Jersey Application October 27, 1938, Serial No. 237,205

2 Claims. (Cl. 285—1)

This invention relates to apparatus for vulcanizing pneumatic tires, and more particularly it relates to a fluid tight joint formed between sections of a tire vulcanizer.

In general, the invention comprises a pair of relatively movable mold sections, a removable adaptor having a port arranged between the mold sections, a sealing gasket support extending from one of the mold sections including an aperture in alignment with said port, a sealing gasket located by said support, and a retaining member positioned exteriorly of the gasket and support both of which contact with said adaptor when the mold sections are in closed position.

In the manufacture of pneumatic tires, and particularly in the vulcanization of tires in the unit or two-section type of vulcanizing molds, it is customary to employ a curing bag within the tire, the curing bag having an adaptor for connection to a source of fluid supply. In some cases these connections are joined manually. In other cases, the sealing means forms a part of the curing bag equipment. As it is customary to provide several curing bags for use with each vulcanizing mold, it is more desirable to form the sealing means as part of the mold equipment in order to minimize the number of sealing means required. Furthermore, the removal and replacement of curing bags results in continual variations in temperature, a condition which is not beneficial to the life of sealing gaskets. When sealing gaskets are formed as part of the mold equipment, the temperature to which they are subjected is substantially uniform during and between vulcanizing operations. In construction and function the sealing means of my invention is unique in that it provides an automatically adjustable gasket arrangement adapted to provide a leak proof connection for relatively high pressures.

Among the objects of the invention are to provide an efficient and automatic connection adapted to form a seal upon the closing of mold sections; to permit a reduction in the number of sealing means used in the process of vulcanizing tires; to provide a connection adapted to function under conditions of substantially uniform temperatures; and to provide a construction which permits gaskets to be removed and replaced quickly and without necessitating the use of tools.

These and other objects and advantages will appear more fully in the following detailed description when considered in connection with the accompanying drawing, in which.

Figure 1:
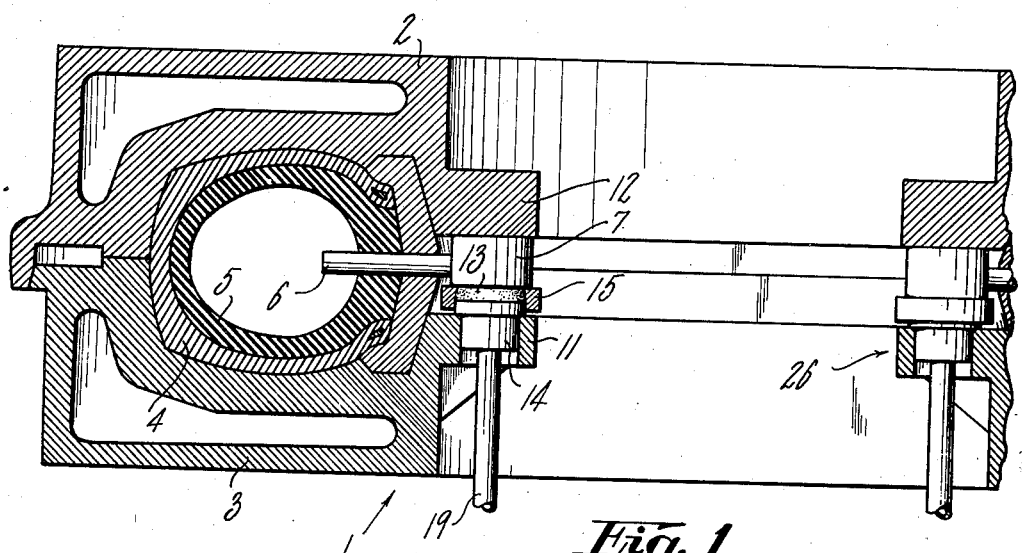
Fig. 1 is a transverse view, in section of a portion of a mold assembly, illustrating an example of the application of my invention.

Referring to the drawing, and in particular to Fig. 1, I show one form of application of the invention in the embodiment of sealing means for conducting fluid to a pneumatic tire vulcanizing unit 1. Essentially, the vulcanizing unit comprises upper and lower mold sections 2 and 3, respectively, one of which may be opened or closed relative to the other. Within the vulcanizer is shown a pneumatic tire 4 and a conventional curing bag 5.

Figure 3:
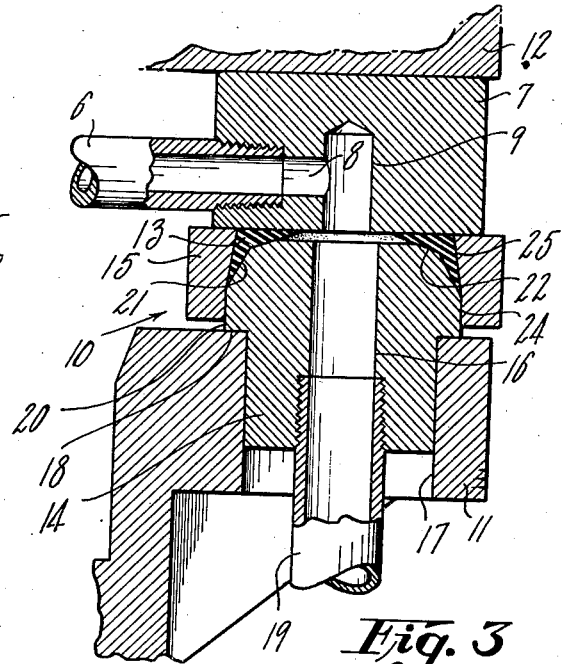
Fig. 3 is a transverse view, in section, illustrating the connection in closed position.

The curing bag 5 is provided with a connector comprising a tubular member 6 secured to the curing bag, and an adaptor 7 secured to the tubular member. As shown particularly in Fig. 3, the adaptor is a cylindrical member having a radial aperture 8 and an axial aperture 9 open at one end of the cylindrical member and communicating with the radial aperture. The tubular member 6 connects with the adaptor in alignment with the radial aperture.

When the tire and curing bag are assembled within the vulcanizer, the adaptor 7 projects outwardly from the mold to facilitate attachment of the adaptor to a fluid supply source. A sealing means 10 is located in alignment with the adaptor 7, and a bracket 11 extending from the lower mold section 3 supports the sealing means. An opposed bracket 12 extending from the upper mold section 2 engages with the adaptor 7 to form with the bracket 11 a means of confining the adaptor with the sealing means.

Sealing means 10 comprises three essential elements; a gasket 13, a gasket support or nozzle 14, and a gasket retaining ring 15. The gasket support 14 is substantially a cylindrical member having a central bore 16. The bracket 11 extending from the lower mold section 3 includes a bore 17 in which the gasket support fits tightly. A shoulder 18 formed on the gasket support limits its downward movement with respect to the bracket 11. A conduit 19 through a threaded engagement is attached in axial alignment with the bore 16 of the gasket support and forms means through which fluid may be conducted to the vulcanizer. The gasket support 14 includes a cylindrical portion 20 and a tapered portion 21 forming a frusto-conical surface. A beveled edge 22 lies adjacent the horizontal top surface of the support 14 and its frusto-conical surface 21.

Figure 2:
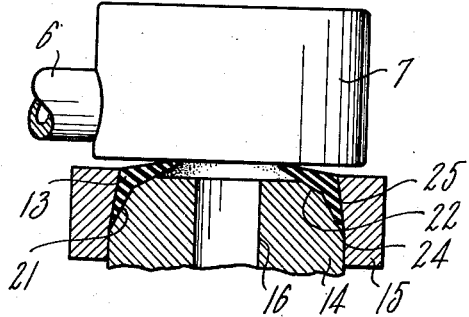
Fig. 2 is an elevational view, partly in section, showing the relationship between a sealing means and connecting member before closing.
Figure 4:
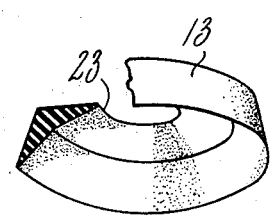
Fig. 4 is a perspective view, partly broken and partly in section, of a sealing gasket.

The gasket 13, shown more particularly in Fig. 4, is formed of resilient material such as rubber composition or other material suitable for packing purposes, such as a combination of resilient materials and fibers. The inner surface of the gasket is frusto-conical in conformity with a complementary surface 21 of the gasket support. The outer surface of the gasket 13 is also frusto-conical, but its included angle is less than that formed by the geometrical shape of inner surface of the gasket, resulting in the formation of a gasket wall which, in cross section, is relatively thick at its uppermost portion and tapering to a thin edge at its base portion. The top portion of the gasket is substantially similar in shape to the side wall portion thereof. The surfaces of the top wall converge in a tapered edge, forming an aperture 23. As shown in Fig. 2, the upper surface of the top wall of the gasket, instead of being formed in a horizontal plane, is inclined angularly, the tapered edge forming the aperture being more remote horizontally than the remaining portion of the gasket.

The retaining ring 15 includes an axial bore, the surface of which conforms in part with the gasket support 14 and the gasket 13. A portion of the bore forms a cylindrical surface 24 which is adapted to fit in slidable engagement with the cylindrical portion 20 of the gasket support 14. A portion of the bore of the retaining ring 15 has a frusto-conical surface 25 in complementary conformity with the outer surface of the gasket 13. By this arrangement, the retaining ring 15 is supported vertically by the gasket 13 and is supported transversely by the gasket support 14.

In vulcanizing operations embodying the sealing means of my invention, a tire and curing bag including the adaptor 7 are located in the lower mold section 3 in such manner that the adaptor 7 is substantially in axial alignment with the sealing means 10. During this loading operation the upper mold section 2 is in elevated position with respect to the lower mold section. When the mold sections are closed, the bracket 12 engages with the upper surface of the adaptor 7, forcing the lower surfaces thereof to engage with the gasket 13 and retaining ring 15. During this engagement the retaining ring 15 moves downwardly a short distance, thereby compressing the gasket 13 to cause same to form an effective seal between the adaptor 7 and the gasket support 14.

Fig. 2 shows the adaptor before it is pressed firmly against the sealing means illustrating how the edges of the gasket formed by the margin of the aperture 23 engage firmly with the underside of the adaptor 7 so as to prevent escape of fluid at this junction. In the operation of this type of sealing means it will be noted that no direct attachment between the sealing means is necessary. The sealing means is closed by a butt engagement and is held in that relationship by the mold sections. The mold sections may be opened or closed without attention to the sealing means, and without requiring any special duties of the vulcanizing operator.

If it is desired to remove one of the gaskets, the operator merely raises the retaining ring 15, removes the old gasket, inserts a new one, and replaces the retaining ring. This may be accomplished quickly and efficiently without the use of any tools, and without generally interrupting the cycle of operation of the vulcanizer.

As shown in Fig. 1, one or more sealing means may be provided in the same vulcanizing unit. For example, a second sealing unit 26 may be employed which may be substantially similar in construction and function to the sealing means hereinbefore described. When two units are used on a single vulcanizer, one of the units may function as an inlet to the curing bag, while the other unit functions as an outlet.

While I have shown and described a preferred embodiment of the invention, it is to be understood that it may be otherwise embodied within the scope of the appended claims.

Having thus described my invention, what I claim and desire to protect by Letters Patent is:

1. Connecting means for a vulcanizer comprising an apertured gasket supporting member having shank and shoulder portions thereon for centering and holding engagement with an aperture formed in a vulcanizing mold whereby it may be retained in a substantially fixed position relative thereto, said gasket supporting member terminating in a gasket seat, an apertured flexible gasket positioned upon said seat, and a removable ring having a sliding fit with said gasket supporting member and engaging said gasket for retaining the gasket upon the supporting member, said gasket having a free frusto-conical edge portion extending outwardly beyond the marginal limits of said gasket supporting member and said ring, whereby said free edge portion is adapted to be flexed by and form a seal for a readily retractible apertured adaptor while transmitting fluid therethrough.

2. Readily separable connecting means for the transmission of fluid pressure comprising a hollow member terminating in a frusto-conical surface, a rubber gasket having a cup-like flanged portion adapted to conform to said frusto-conical surface and an end portion having an opening therethrough, said end portion normally projecting beyond and out of engagement with the surfaces of said hollow member, a sleeve adapted to surround said hollow member and confine the flanged portion of said gasket, said sleeve terminating short of the normal position of the opening in the end of said gasket, and a second member having a fluid passage-way therethrough for engaging the end of said gasket and confining it within the end surfaces of said sleeve and said hollow member whereby the gasket closes the joint between said hollow and said second members.

FRANCIS I. HONDERICH.